(12) United States Patent
Kakuma et al.

(10) Patent No.: US 7,859,829 B2
(45) Date of Patent: Dec. 28, 2010

(54) ELECTROLYTIC CAPACITOR AND METHOD OF PRODUCING THE SAME

(75) Inventors: Kenji Kakuma, Izumo (JP); Masakazu Hosogi, Unnan (JP)

(73) Assignees: SANYO Electric Co., Ltd., Moriguchi-shi (JP); SUN Electronic Industries Corp., Shijonawate-shi (JP); Shin-Etsu Polymer Co., Ltd., Tokyo (JP)

( * ) Notice: Subject to any disclaimer, the term of this patent is extended or adjusted under 35 U.S.C. 154(b) by 348 days.

(21) Appl. No.: 12/061,789

(22) Filed: Apr. 3, 2008

(65) Prior Publication Data

US 2008/0247119 A1  Oct. 9, 2008

(30) Foreign Application Priority Data

Apr. 3, 2007 (JP) ............................. 2007-097262

(51) Int. Cl.
*H01G 9/00* (2006.01)
(52) U.S. Cl. ...................... 361/523; 361/516; 361/519; 361/525; 361/528; 361/529
(58) Field of Classification Search .................. 361/523, 361/516–519, 525–529, 540–541; 29/25.01, 29/25.03
See application file for complete search history.

(56) References Cited

U.S. PATENT DOCUMENTS

| | | | |
|---|---|---|---|
| 5,485,346 | A | 1/1996 | Kanbara et al. |
| 6,519,135 | B2 * | 2/2003 | Sano et al. ................... 361/510 |
| 6,519,137 | B1 | 2/2003 | Nitta et al. |
| 6,870,727 | B2 * | 3/2005 | Edson et al. ................. 361/523 |
| 6,962,612 | B1 | 11/2005 | Saito et al. |
| 7,497,879 | B2 * | 3/2009 | Kakuma et al. ............ 29/25.03 |
| 7,515,396 | B2 * | 4/2009 | Biler .......................... 361/525 |

FOREIGN PATENT DOCUMENTS

| | | |
|---|---|---|
| JP | 2-15611 A | 1/1990 |
| JP | 2-186616 A | 7/1990 |
| JP | 05-144677 A | 6/1993 |
| JP | 5-273110 A | 10/1993 |
| JP | 9-7894 A | 1/1997 |
| JP | 11-186110 A | 7/1999 |
| JP | 2003-229330 A | 8/2003 |
| JP | 2004-349683 A | 12/2004 |
| JP | 2005-322917 A | 11/2005 |
| JP | 2006-295184 A | 10/2006 |

OTHER PUBLICATIONS

Report of Search of Prior Art with English translation (Concise explanation of relevance).
US Office Action dated May 28, 2008, issued in related U.S. Appl. No. 11/819,581.
US Office Action (Notice of Allowance) dated Oct. 30, 2008, issued in related U.S. Appl. No. 11/819,581.

* cited by examiner

*Primary Examiner*—Nguyen T Ha
(74) *Attorney, Agent, or Firm*—Westerman, Hattori, Daniels & Adrian, LLP

(57) ABSTRACT

An electrolytic capacitor includes a cathode body. The cathode body includes a conductive solid layer having particles of conductive solid, formed using a dispersion including particles of conductive solid and a solvent. The particles of the conductive solid in the dispersion have a first particle size distribution peak and a second particle size distribution peak satisfying $\mu_1 > \mu_2$, where $\mu_1$ and $\mu_2$ are the average particle size of the first and second particle size distribution peaks, respectively, in particle size distribution measurement. Accordingly, there is provided an electrolytic capacitor reduced in ESR, and further having high withstand voltage and low leakage current.

13 Claims, 2 Drawing Sheets

ELECTROLYTIC CAPACITOR AND METHOD OF PRODUCING THE SAME

BACKGROUND OF THE INVENTION

1. Field of the Invention

The present invention relates to an electrolytic capacitor, and a method of producing such an electrolytic capacitor.

2. Description of Related Art

In accordance with digitization of electronic equipment, the capacitor employed therein is required to be compact with a large capacitance, as well as having a small equivalent series resistance (hereinafter, abbreviated as ESR) in the high frequency region.

Conventionally, capacitors for high frequency regions include plastic film capacitors, laminated ceramic capacitors, and the like, all having a relatively small capacitance.

As a compact capacitor of large capacitance, having a relatively low ESR, there is known an electrolytic capacitor employing electron conductive material such as manganese dioxide, TCNQ (7,7,8,8-tetracyanoquinodimethane) complex salt, or the like for the cathode material. In recent years, there is also known the usage of an electrolytic capacitor including a conductive solid layer formed of conductive polymer such as polypyrrole, polythiophene, polyfuran, polyaniline and the like for the cathode.

The structure of an electrolytic capacitor including a conductive solid layer in the cathode includes the type having a dielectric film formed on the surface of an anode sintered compact or anode foil made of a valve action metal such as aluminum, tantalum or the like and further having a conductive solid layer, a graphite layer, and a silver paint layer sequentially formed thereon. There is also the so-called wound-type electrolytic capacitor having a conductive solid layer formed on a dielectric film of a capacitor element made by winding an anode foil such as of aluminum with the dielectric film at the surface and an opposite cathode foil together with a separator therebetween, impregnated with an electrolyte, as necessary.

For example, Japanese Patent Laying-Open No. 02-015611 discloses an electrolytic capacitor including a specific polythiophene for the solid electrolyte. With regards to a wound-type electrolytic capacitor, Japanese Patent Laying-Open No. 11-186110, for example, teaches an electrolytic capacitor produced by the steps of impregnating a wound-type capacitor element with monomer forming conductive polymer, and immersing the same in an aqueous solution of an oxidizing agent such as ammonium persulfate to cause chemical oxidative polymerization of the monomer to form the conductive polymer. Japanese Patent Laying-Open No. 2005-322917 discloses an electrolytic capacitor produced by the steps of introducing a mixture of a precursor and an oxidizing agent directed to production of conductive polymer into a porous electrode body covered with a dielectric layer, exposing the porous electrode body impregnated with the mixture of the precursor and oxidizing agent to a certain relative humidity to cause polymerization of the precursor to form a solid electrolyte.

However, none of the electrolyte capacitors set forth above have sufficient withstand voltage, as well as a low ESR of a satisfactory level.

SUMMARY OF THE INVENTION

In view of the foregoing, an object of the present invention is to provide an electrolytic capacitor having sufficient low ESR, high withstand voltage, and low leakage current. An other object of the present invention is to provide a method of producing such an electrolytic capacitor relatively readily.

The inventors researched diligently on an electrolytic capacitor having a conductive solid layer formed by impregnating a capacitor element with liquid dispersion including particles of conductive solid and/or aggregates of the particles. The inventors found that the problem set forth above could be solved by using the particles of conductive solid and/or aggregates of the particles in the dispersion liquid having at least two discrete particle size distribution peaks differing in average particle size instead of the conductive solid having a single particle size distribution peak. The inventors also found that the highest scattering intensity of the particle size distribution peak of larger average particle size is preferably higher than the highest scattering intensity of the particle size distribution peak of smaller average particle size.

In addition, it was found that, by forming a conductive solid layer using liquid dispersion including particles of conductive solid and/or aggregates of the particles having at least two particle size distribution peaks of different average particle size, wherein an average particle size of one of the two particle size distribution peaks is equal to or greater than an average pore diameter of pores at the surface of an anode body and the average particle size of the other of the two particle size distribution peaks is smaller than that average pore diameter, the ESR can be further reduced and the capacitance further improved in the electrolytic capacitor. The present invention is summarized as follows.

The electrolytic capacitor of the present invention includes a capacitor element. The capacitor element includes an anode body having a plurality of pores at a surface, a dielectric film formed at the surface of the anode body, and a cathode body formed on the dielectric film. The cathode body includes a conductive solid layer. The conductive solid layer includes particles of conductive solid and/or aggregates of the particles, formed using a dispersion including conductive solid particles and/or aggregates thereof and a solvent. The conductive solid particles and/or aggregates thereof in the dispersion have a first particle size distribution peak and a second particle size distribution peak satisfying a relationship (1) set forth below in particle size distribution measurement by a dynamic laser light scattering method:

$$\mu_1 > \mu_2 \qquad (1)$$

where $\mu_1$ and $\mu_2$ represent the average particle size of the first and second particle size distribution peaks, respectively.

The highest scattering intensity of the first particle size distribution peak is preferably higher than the highest scattering intensity of the second particle size distribution peak. In addition, average particle size $\mu_1$ of the first particle size distribution peak is equal to or greater than the average pore diameter of pores in the anode body. Average particle size $\mu 2$ of the second particle size distribution peak is preferably smaller than the average pore diameter of pores in the anode body.

The particles of conductive solid and/or aggregates of the particles in the dispersion preferably have a third particle size distribution peak and a fourth particle size distribution peak between the first particle size distribution peak and the second particle size distribution peak.

The average particle size of the first, third and fourth particle size distribution peaks is at least three times the average particle size of an adjacent particle size distribution peak having a smaller average particle size.

The highest scattering intensity of the first particle size distribution peak is preferably at least two times the highest scattering intensity of an adjacent particle size distribution peak having a smaller average particle size. The highest scattering intensity of the first particle size distribution peak is preferably at least two times the highest scattering intensity of the particle size distribution peak having the third largest average particle size.

The conductive solid preferably includes conductive polymer. The conductive polymer is preferably selected from at least one member of the group consisting of polypyrrole, polythiophene, and derivatives thereof. The conductive polymer is more preferably polyethylenedioxythiophene.

The capacitor element includes a wound-type element having an anode body formed of metal foil with a dielectric film on the surface and an opposite cathode foil wound to a roll with a separator therebetween. The cathode body preferably includes an electrolyte. The electrolyte preferably includes a non-aqueous solvent and organic salt.

The non-aqueous solvent is preferably selected from at least one member of the group consisting of γ-butyrolactone and sulfolane. The organic salt preferably includes organic amine salt.

The present invention also provides a method of producing an electrolytic capacitor, comprising the steps of: impregnating a capacitor element including a wound-type element having an anode body formed of metal foil with a dielectric film on the surface and an opposite cathode foil wound to a roll with a separator therebetween with a dispersion including particles of conductive solid and/or aggregates of the particles and a solvent; following impregnation with the dispersion, causing the solvent to evaporate to form a conductive solid layer at the surface of the dielectric film; and impregnating the conductive solid layer with an electrolyte in gaps.

In accordance with the present invention, an electrolytic capacitor having further reduced ESR, higher withstand voltage, and lower leakage current is provided. In accordance with the production method of an electrolytic capacitor of the present invention, a conductive solid layer is formed by impregnation with liquid in which conductive solid is dispersed. Therefore, an electrolytic capacitor can be produced relatively readily.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Electrolytic Capacitor>

An electrolytic capacitor of the present invention is generally completed by connecting an anode lead frame and a cathode lead frame to respective electrodes of a capacitor element, followed by encapsulation with a coat resin. The basic structure of a capacitor element corresponds to the well-known structure in conventional art. For example, a conductive solid layer, a graphite layer, and a silver paint layer, qualified as the cathode body, are sequentially formed on an anode body made of valve action metal with a dielectric film at the surface. The valve action metal constituting the anode body includes, but is not particularly limited to, tantalum, niobium, and the like. The dielectric film can be formed by chemical conversion treatment at the surface of the sintered compact of the valve action metal. The capacitor element is impregnated with an electrolyte, as necessary.

Figure 1:
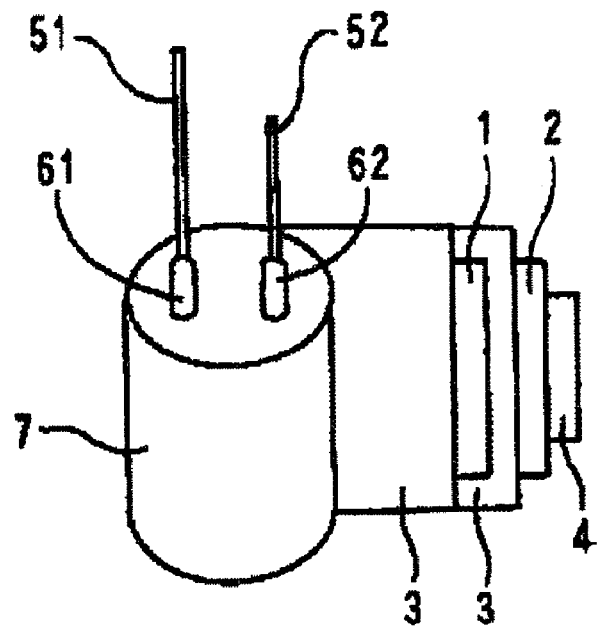
FIG. 1 is a schematic exploded view of an example of a wound-type capacitor element preferably employed in the present invention.
Figure 2:
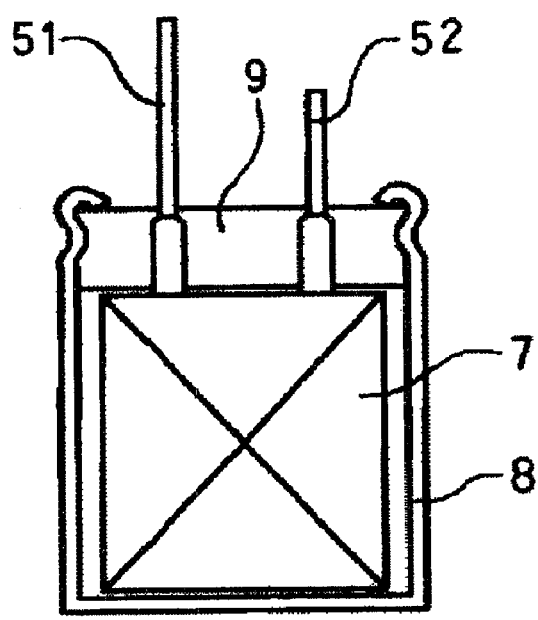
FIG. 2 is a sectional view of an electrolytic capacitor of the present invention.

The capacitor element employed in the present invention may be the so-called wound-type capacitor element including an anode body formed of a metal foil with a dielectric film at the surface and an opposite cathode foil, wound to a roll with a separator therebetween. FIG. 1 is a schematic exploded view of an example of a wound-type capacitor element. A capacitor element 7 is formed including an anode foil 1 that is valve action metal foil such as of aluminium, tantalum, niobium, or titanium subjected to etching for surface-roughening and chemical conversion treatment for formation of a dielectric film, and an opposite cathode foil 2, wound to a roll with a separator 3 therebetween. Following the winding, they are held together by means of a tape 4. A lead 51 and a lead 52 are connected to anode foil 1 and opposite cathode foil 2 via a lead tab 61 and a lead tab 62, respectively. A conductive solid layer constituting a portion of the cathode body is formed on the dielectric film, and impregnated with an electrolyte, as necessary. Following impregnation with the electrolyte, capacitor element 7 is placed in an aluminum-made cylindrical case 8 with a bottom. A rubber packing 9 is attached to the opening, followed by a drawing process and curling process. By applying an aging process during application of a rated voltage, an electrolytic capacitor is completed.

In the electrolytic capacitor of the present invention, the conductive solid layer includes particles of conductive solid and/or aggregates of the particles. The conductive solid layer can be formed using a dispersion including particles of conductive solid and/or aggregates of the particles and a solvent. The specific method of forming a conductive solid layer will be described afterwards. In the present invention, the particles of conductive solid and/or aggregates of the particles in the dispersion have a first particle size distribution peak and a second particle size distribution peak that satisfy the relationship (1) set forth below in the particle size distribution measurement by a dynamic laser light scattering method. Preferably, the first and second particle size distribution peaks are discrete.

$$\mu_1 > \mu_2 \quad (1)$$

where $\mu_1$ and $\mu_2$ represent the average particle size of the first and second particle size distribution peaks, respectively. In the present specification, "average particle size" of the particle size distribution peak refers to the average of the particle size of particles and/or aggregates thereof constituting the relevant particle size distribution peak. In the case where at least a portion of the particles of the conductive solid that is the interest of measurement in the particle size distribution measurement by a dynamic laser light scattering method aggregates in the medium to form aggregates, the particle size as an aggregate will be measured in association with the aggregate. The average particle size $\mu$ of the particle size distribution peak can be obtained from the particle size distribution measurement by a dynamic laser light scattering method. In the present invention, measurements are provided under the following measurement conditions:

measurement device: dynamic light scattering particle size distribution analyzer (product of Otsuka Denshi K.K., concentrated system particle size analyzer FPAR1000); temperature of measurement: 25° C.; solvent: water.

The relationship (1) set forth above indicates that the average particle size $\mu_1$ of the first particle size distribution peak is larger than the average particle size $\mu_2$ of the second particle size distribution peak. This means that the first particle size distribution peak is located at the larger particle size than the second particle size distribution peak in the particle size distribution measurement chart. In the present invention, the first particle size distribution peak is preferably discrete from the second particle size distribution peak. "Discrete" as used herein implies that the two peaks are distant sufficiently from each other, but does not exclude an overlap between the bottom skirt regions of the peaks. More preferably, the first and second particle size distribution peaks satisfy the relationship of (2) set forth below.

$$\mu_1 - \mu_2 > 2\sigma_1 + 2\sigma_2 \qquad (2)$$

where $\sigma_1$ and $\sigma_2$ represent the standard deviation of the first and second particle size distribution peaks, respectively.

The foregoing relationship (2) implies that the difference between the average particle sizes ($\mu_1-\mu_2$) is larger than the sum of 2×(standard deviation $\sigma_1$ of first particle size distribution peak) and 2×(standard deviation $\sigma_2$ of second particle size distribution peak). The significance of the relationship (2) will be described in detail hereinafter.

It is known that when a certain distribution peak corresponds to a normal distribution, the probability of occupation in the zone (a−2b, a+2b) is 0.954, where a is the average of the distribution peak and b is the standard deviation. By applying this to the event of the conductive solid particles and/or aggregates of the present invention, 95.4% of the particles (and/or aggregates) constituting the first particle size distribution peak will belong to the range of the zone ($\mu_1-2\sigma_1$, $\mu_1+2\sigma_1$). This means that the first particle size distribution peak will not include particles (and/or aggregates) having a particle size substantially smaller than $\mu_1-2\sigma_1$ with regards to the lower limit. Similarly, 95.4% of the particles (and/or aggregates) constituting the second particle size distribution peak will belong to the range of the zone ($\mu_2-2\sigma_2$, $\mu_2+2\sigma_2$). This means that the second particle size distribution peak will not include particles having a particle size substantially larger than $\mu_2+2\sigma_2$ with regards to the upper limit. Therefore, $\mu_1-\mu_2>2\sigma_1+2\sigma_2$ in the foregoing relationship (2) implies that the first particle size distribution peak and the second particle size distribution peak are not substantially overlapping, and sufficiently discrete.

Thus, the particles of conductive solid and/or aggregates of the particles included in the dispersion employed in the present invention has two particle size distribution peaks that are preferably discrete enough. In general, the packing rate of space occupied by particles in a mixture of particles is improved as the ratio of the difference in the particle size becomes greater. The present invention takes advantage of this event, and includes at least two groups of particles differing in the average particle size, preferably having a large particle size ratio. The packing rate of the particles (and/or aggregates) in the obtained conductive solid layer is improved. As a result, the density of the conductive solid layer is increased, achieving reduction in the ESR of the electrolytic capacitor.

In addition, the highest scattering intensity of the first particle size distribution peak is preferably larger than the highest scattering intensity of the second particle size distribution peak. As used herein, "highest scattering intensity" refers to the scattering intensity at the vertex of the particle size distribution peak. The scattering intensity depends upon the number of particles and the particle size, and is higher as the number of particles and/or particle size is larger. In general, when particles of a large particle size and particles of a small particle size are mixed, the space packing rate is improved by increasing the number of particles having the larger particle size. Therefore, the highest scattering intensity of the first particle size distribution peak is set higher than the highest scattering intensity of the second particle size distribution peak to increase the density of the conductive solid layer. Accordingly, the ESR of the electrolytic capacitor can be reduced. In addition, the thickness of the conductive solid layer formed on the surface of the anode body can be increased, contributing to reduction in ESR. The highest scattering intensity of the first particle size distribution peak is preferably at least two times, more preferably at least three times the highest scattering intensity of the second particle size distribution peak.

The value of the highest scattering intensity of each peak can be obtained by particle size distribution measurement through the aforementioned dynamic laser light scattering method.

The average particle size $\mu_1$ of the first particle size distribution peak is preferably equal to or larger than the average pore diameter of pores at the surface of the anode body. By using such particles having a particle size relatively larger than those of the conventional case, the contact points between the conductive solid particles and/or aggregates thereof located on the dielectric film is reduced. Therefore, the conductivity of the cathode electrode is improved to allow reduction in ESR.

Conventional electrolyte capacitors employ conductive solid particles of a size capable of entering the pores at the surface of the anode body, aiming to apply conductivity even in the pores. The pores at the surface of the anode body include pores of a sintered compact in the case where the anode body is formed of a sintered compact (hereinafter, also referred to as a sintered compact pore) and etched pores caused by etching in the case where the anode body is formed of an aluminum foil or the like. In the present specification, the average pore diameter of the sintered compact pores refers to the average micropore diameter measured by the mercury intrusion technique. The average pore diameter of the etching pores refers to the average value of the pore diameter measured at an arbitrary site using an SEM (Scanning Electron Microscope).

The average particle size $\mu_1$ of the first particle size distribution peak is preferably set equal to or larger than the average pore diameter of pores at the surface of the anode body in view of the issue set forth hereinafter. In the case where the anode body is formed of a sintered compact of tantalum particles, niobium particles, or the like, many holes are present at the surface of the sintered compact, and a dielectric film is formed along the inner surface in the pores. Therefore, many pores (sintered compact pores) with a dielectric film along the inner surface will be formed at the surface where a conductive solid layer is to be formed. In the case where an anode foil such as an aluminum foil or the like is employed for the anode body, etching is applied to increase the surface area, resulting in the formation of etching pores. A dielectric film is formed along the inner surface of the etching pores. Therefore, there are many etching pores having a dielectric film along the inner surface at the surface where a conductive solid layer is to be formed. By setting the average particle size $\mu_1$ of the first particle size distribution peak equal to or larger than the average pore diameter of the sintered compact pores or etching pores, the particles of conductive solid and/or aggregates of the particles corresponding to the first particle size distribution peak will not be able to enter these pores. Therefore, the sintered compact pores or etching pores can be filled with an electrolyte, or with particles and/or aggregates of smaller particle size constituting the second particle size distribution peak. By filling the pores with an electrolyte or with particles and/or aggregates of smaller particle size, instead of the particles and/or aggregates corresponding to the first particle size distribution peak, the capacitance can be further increased. In addition, the leakage current can be further reduced in the case where the pores are filled with an electrolyte. Specifically, since the average pore diameter of the sintered compact pores is approximately 0.1 to 2 μm and the average pore diameter of etching pores are approximately 0.1 to 0.4 μm, the average particle size $\mu_1$ of the first particle size distribution peak is preferably set larger than the aforementioned value, more preferably at least 0.4 μm. In the case where the average pore diameter of the sintered compact pores and etching pores is smaller than this value, the average particle size $\mu_1$ of the first particle size distribution peak can be set smaller according to the average pore diameter of the pores. The upper limit of the average particle size $\mu_1$, though not particularly limited, is preferably not more than 100 μm, more preferably not more than 20 μm, in consideration of the stability and impregnation of the dispersion including particles of conductive solid and/or aggregates of the particles and a solvent that will be described afterwards.

The average particle size $\mu_2$ of the second particle size distribution peak is preferably smaller than the average pore diameter of the pores at the surface of the anode body. More specifically, since the average pore diameter of the sintered compact pores is approximately 0.1 to 2 μm and the average pore diameter of the etching pores is approximately 0.1 to 0.4 μm in general, as set forth above, the average particle size 42 of the second particle size distribution peak is preferably smaller than the aforementioned value, more preferably less than 0.1 μm. In the case where the average pore diameter of the sintered compact pores and etching pores is smaller than this value, the average particle size $\mu_2$ of the second particle size distribution peak can be set smaller according to the average pore diameter of the pores. The particles of conductive solid and/or aggregates of the particles corresponding to the second particle size distribution peak can enter such pores, whereby the capacitance of the electrolytic capacitor is improved. The lower limit of the average particle size $\mu_2$ of the second particle size distribution peak is not particularly limited, and the capacitance of the electrolytic capacitor can be improved as the average particle size becomes smaller. However, from the standpoint of avoiding entry of conductive solid particles and/or aggregates into a defect in the dielectric film, the lower limit is preferably at least 0.01 μm, more preferably at least 0.02 μm. By setting the particle size of the conductive solid particles and/or aggregates to a level avoiding entry into a defect in the dielectric film, and effecting impregnation with an electrolyte to cause the electrolyte to permeate into such defects, the defects can be repaired, allowing an electrolytic capacitor of high withstand voltage and low leakage current. It is expected that the average pore diameter of the sintered compact pores and etching pores will further become smaller in accordance with the increase of the capacitance. It is natural that the particle size distribution peak of the conductive solid particles and/or aggregates will comply with the change.

In addition, the conductive solid particles and/or aggregates in the dispersion preferably include at least a third particle size distribution peak and/or a fourth particle size distribution peak between the first and second particle size distribution peaks in the particle size distribution measurement through a dynamic laser light scattering method. By the inclusion of such conductive solid particles and/or aggregates having a particle size of an intermediate level, the gaps in the conductive solid layer formed on the dielectric film by the conductive solid particles and/or aggregates constituting the first particle size distribution peak can be filled, which leads to improvement of the ESR and capacitance for the electrolytic capacitor. The number of particle size distribution peaks present between the first particle size distribution peak and the second particle size distribution peak may be one or more. From the standpoint of the possibility of various sizes of gaps in the conductive solid layer, the number of particle size distribution peaks is preferably two or more. In the case where a plurality of particle size distribution peaks are observed in the particle size distribution measurement through a dynamic laser light scattering method, the peaks, whether completely discrete or partially overlapping, are set such that the first and second particle size distribution peaks preferably have the relationship of (2), as set forth above.

In the case where the particles of conductive solid and/or aggregates of the particles have the first to fourth particle size distribution peaks set forth above, the average particle size of the first, third, and fourth particle size distribution peaks is preferably at least three times the average particle size of an adjacent particle size distribution peak having a smaller average particle size. Accordingly, particles of smaller particle size can effectively permeate into the gaps of particles having a larger particle size to allow further improvement of the capacitance of the electrolytic capacitor.

The reason why the ratio of the average particle size of an adjacent particle size distribution peak should be set to three times or larger will be described hereinafter. In the case where spherical particles having a diameter of 20 are arranged in a body-centered cubic lattice structure, calculation can be made that the largest diameter of a spherical particle A that can enter the lattice is 14.64. In the case where four spherical particles having a diameter of 20 are arranged in contact with each other and form a regular triangular pyramid, calculation is made that the largest diameter of a spherical particle B that can enter the space surrounded by the four spherical particles is 4.5. Therefore, the ratio of the largest diameter of spherical particle A to the largest diameter of spherical particle B is 14.64/4.5=3.3. Accordingly, in consideration of the arrangement of the particles (and/or aggregates) of the conductive solid layer constituting the first particle size distribution peak taking a body-centered cubic lattice structure and a regular triangular pyramid structure in the conductive solid layer, the presence of two types of particles that can fill the internal space of both structures is preferable. Therefore, the particle diameter ratio thereof is preferably approximately three times or more.

Furthermore, the highest scattering intensity of the first particle size distribution peak is preferably at least two times the highest scattering intensity of an adjacent particle size distribution peak having a smaller average particle size (third or fourth particle size distribution peak). In addition, the highest scattering intensity of the first particle size distribution peak is preferably at least two times the highest scattering intensity of a particle size distribution peak having the third largest average particle size (the fourth or third particle size distribution peak). Accordingly, an appropriate amount of small particles will permeate into the gaps of the particles of the first particle size distribution peak. Therefore, the ESR of the electrolytic capacitor can be reduced, and gaps in a conductive solid layer capable of efficient impregnation with an electrolyte can be formed. For example, when the sum of the highest scattering intensity of the third particle size distribution peak and the highest scattering intensity of the fourth particle size distribution peak is equal to the highest scattering intensity of the first particle size distribution peak, the highest scattering intensity of the first particle size distribution peak is two times the highest scattering intensity of each of the third and fourth particle size distribution peaks. However, since the average particle size of the first particle size distribution peak is larger than those of the third and fourth particle size distribution peaks, having corresponding higher scattering intensity, a scattering intensity of at least two times is required to set the number of particles of the first particle size distribution peak larger than the number of particles of the third and fourth particle size distribution peaks.

Manganese dioxide, TCNQ, conductive polymer and the like can be cited for the conductive solid employed in the formation of a conductive solid layer. The conductive polymer is used preferably. For example, polypyrrole, polythiophene, and derivatives thereof are preferably employed as the conductive polymer in view of the high electrical conductivity. Particularly, polyethylenedioxythiophene (poly(3,4-ethylenedioxythiophene) is preferable by virtue of the extremely high electrical conductivity.

The capacitor element in the present invention may be impregnated with an electrolyte as a portion of the cathode. Accordingly, the conductive solid layer formed on the dielectric film as well as the conductive solid layer at the surface of the separator and opposite cathode foil, when formed, is impregnated with an electrolyte in the gaps. By not only forming a conductive solid layer, but impregnating the same with an electrolyte, the electrolyte permeates into a defect in the dielectric film to improve the repairability of the dielectric film. Accordingly, the leakage current can be further reduced. Moreover, the ESR can be reduced.

For the electrolyte, any well-known one can be employed. In particular, an electrolyte including a non-aqueous solvent and organic salt is preferable. As used herein, organic salt refers to salt with at least one of the base and acid constituting the salt being an organic substance. Particularly, in view of high reliability and low specific resistance, γ-butyrolactone, or sulfolane, or a mixture thereof is preferable for the non-aqueous solvent, and organic amine salt is preferable for the organic salt. As used herein, organic amine salt refers to salt including organic amine and organic or inorganic acid. The salt containing organic amine and organic acid is preferably used for the organic amine salt. For example, triethylamine borodisalicylate, ethyldimethylamine phthalate, mono 1,2,3,4-tetramethylimidazolinium phthalate, mono 1,3-dimethyl-2-ethylimidazolinium phthalate, or a mixture thereof can be cited.

The concentration of the organic salt in the non-aqueous solvent is not particularly limited, and the concentration generally employed can be used conveniently. For example, the concentration can be set to 5 to 50 mass %.

<Production Method of Electrolytic Capacitor>

A production method of an electrolytic capacitor of the present invention will be described hereinafter. Although the description is based on a wound-type electrolytic capacitor, the same applies to an electrolytic capacitor of another structure.

(Dispersion Impregnation Step)

In the production method of an electrolytic capacitor of the present invention, the above-described capacitor element including an anode foil having a dielectric film formed and an opposite cathode foil wound to a roll with a separator therebetween is impregnated with a dispersion including particles of conductive solid and/or aggregates of the particles and a solvent.

The conductive solid is as set forth above. The solvent dispersing the conductive solid includes, but not particularly limited to, water, and various types of organic solvents. The solvent may be a mixed solvent of water and another solvent. In view of the manageability and dispersing property of the conductive solid, water is preferable.

The method for preparing a dispersion includes, but not particularly limited to: (1) preparation by dispersing conductive solid such as conductive polymer in a solvent; and (2) polymerization of monomer that is the precursor of conductive polymer in a solvent constituting a dispersion to synthesize conductive polymer to obtain a dispersion including conductive polymer and the like. As a specific example of method (1), at least two types of conductive polymer particles having a single particle size dispersion distribution peak are dispersed in a solvent. In this case, the particle size distribution peak of the relevant conductive polymer particles preferably has an average particle size set forth above. In the case of method (2), a refining step of removing unreacted monomer and/or impurities is preferably carried out subsequent to the polymerization reaction.

The concentration of the conductive solid in the dispersion is, but not particularly limited to, 1 to 50 mass %, for example. If the concentration of the conductive solid is lower than 1 mass %, a conductive solid layer of sufficient thickness will not be formed, leading to the possibility of defect in property. If the concentration is higher than 50 mass %, an appropriate conductive solid layer will not be formed, leading to the possibility of defect in property such as lower withstand voltage. In order to provide an appropriate conductive solid layer to develop favorable capacitor property, the concentration of the conductive solid in the dispersion is particularly preferably in the range of 3 to 20 mass %.

The method of impregnating the wound-type capacitor element with the dispersion set forth above is not particularly limited, and any conventionally well-known method can be employed. Particularly, the method of immersing the capacitor element in a dispersion stored in a vessel is preferably employed from the standpoint of the relatively easy operation. The immersing time is several seconds to several hours, preferably 1 to 30 minutes, depending upon size of the capacitor element. The temperature of the dispersion during immersion is, but not particularly limited to, 0 to 80° C., preferably 10-40° C., for example. The dispersion impregnation step is preferably carried out under high reduced pressure, for example 30 to 100 kPa, preferably 80–100 kPa, for example, for the purpose of facilitating impregnation and reducing the time required for impregnation. In addition, an ultrasonic process may be applied during impregnation for the purpose of the further facilitating impregnation, or for the purpose of maintaining uniformly the dispersing state of the dispersion.

(Drying Step)

In the following step, the capacitor element with the conductive solid and solvent attached by the impregnation set forth above is dried to cause the solvent to evaporate, whereby a conductive solid layer is formed at the surface of the dielectric film. In this case, usually a conductive solid layer is formed, not only at the surface of the dielectric film, but also at the surface of the separator and the surface of the opposite cathode foil. In accordance with the production method of an electrolytic capacitor of the present invention including such a dispersion impregnation step and the present drying step, a conductive solid layer can be formed without damaging the dielectric film. Furthermore, the production method of an electrolytic capacitor of the present invention including such a dispersion impregnation step and the present drying step eliminates the need of a rinsing step following polymerization reaction in the conventional method of immersing a capacitor element in a solution including a precursor monomer to form a conductive polymer layer on the dielectric film by polymerization through chemical oxidization or the like. Therefore, the time and number of production steps in the production of an electrolytic capacitor can be reduced.

The process of drying the capacitor element can be carried out by the well known process such as drying using a drying furnace. The drying temperature can be set to 80 to 300° C., for example. In the case where the solvent is water, the drying temperature is preferably 100 to 200° C., higher than the boiling point temperature.

The dispersion impregnation step and drying steps set forth above may be repeated a plurality of times, as necessary. Repetition of these steps increases the coverage of the dielectric film surface with the conductive solid layer, i.e. the ratio of the surface of the dielectric film covered with the conductive solid layer, to allow a higher solid capacitance development rate. Accordingly, an electrolytic capacitor of a long life time can be achieved. As used herein, "solid capacitance development rate" refers to the ratio of the capacitance prior to impregnation with an electrolyte to the capacitance after impregnation with an electrolyte, or the capacitance measured with the electrolyte removed from the electrolytic capacitor completed product impregnated with an electrolyte to the capacitance of the electrolytic capacitor completed product impregnated with an electrolyte.

The coverage of the dielectric film surface with a conductive solid layer formed as set forth above is 5 to 100%, for example. The coverage is a value estimated from the solid capacitance development rate. Since the solid capacitance development rate can be regarded as a value directly reflecting the coverage, the value of the solid capacitance development rate obtained by measurement is taken as the coverage. According to the production method of an electrolytic capacitor of the present invention, the coverage can be regulated to the range of 5 to 100%. For example, a conductive solid layer can be formed at a high coverage of approximately 80 to 100%, for example. The formation of a conductive solid layer having such a high coverage allows provision of an electrolytic capacitor of long lifetime. Although the repairability of the dielectric film is generally reduced as the solid capacitance development rate becomes higher, i.e. the coverage with the conductive solid layer becomes higher, the repairability of the dielectric film can be improved by carrying out impregnation with an electrolyte.

(Electrolyte Impregnation Step)

In the following step, the capacitor element having a conductive solid layer formed as set forth above is impregnated with an electrolyte. The composition of the electrolyte is as set forth above. The method of impregnation with an electrolyte is not particularly limited, and any conventionally well-known method can be employed. Particularly, the method of immersing the capacitor element in an electrolyte stored in a vessel is preferably employed from the standpoint of the relatively easy operation. The immersing time is one second to several hours, preferably 1 second to 5 minutes, for example, depending upon size of the capacitor element. The temperature of the electrolyte during immersion is, but not particularly limited to, 0 to 80° C., preferably 10-40° C., for example. The electrolyte impregnation step is preferably carried out under high reduced pressure, for example 30 to 100 kPa, for example, for the purpose of facilitating impregnation and reducing the time required for impregnation.

Following these steps, capacitor element 7 having a conductive solid layer formed and impregnated with an electrolyte is placed in a cylindrical aluminum case 8 with a bottom. Rubber packing 9 is attached to the opening, and a drawing process and curling process are applied. Then, an aging process is carried out for approximately one hour at approximately 125° C., for example, while applying a rated voltage. Thus, an electrolytic capacitor is completed.

The present invention will be described in further detail based on examples and comparative examples hereinafter. It is to be understood that the present invention is not limited thereto.

EXAMPLES

Example 1

(1) Preparation of Conductive Solid Containing Dispersion

Figure 3:
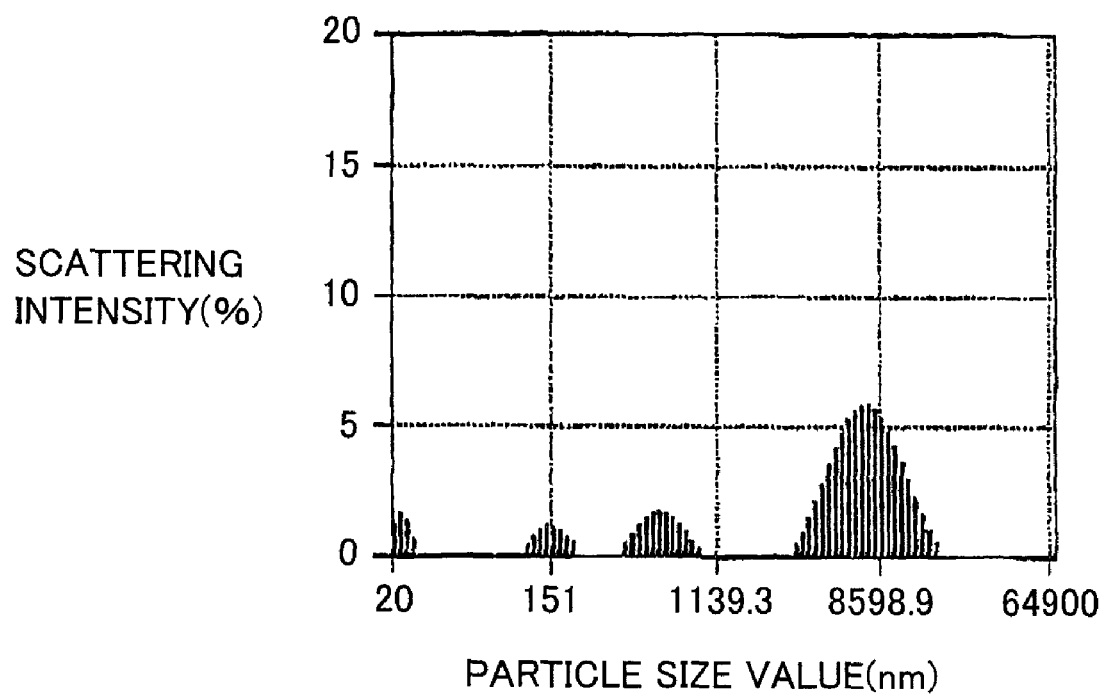
FIG. 3 is a graph representing the results of particle size distribution measurement by a dynamic laser light scattering method for a conductive solid dispersion of Example 1.

A solution having 3,4-ethylenedioxythiophene and polystyrene sulfonic acid serving as a dopant (molecular weight; approximately 150000) dissolved in ion exchange water was mixed at 20° C. While agitating the mixed obtained solution kept at 20° C., an oxidization catalyst solution of ammonium persulfate and ferric sulfate dissolved in ion exchange water was added. Agitation was carried out for 3 hours to cause reaction. The obtained reaction solution was dialyzed to remove unreacted monomer and the oxidation catalyst. A solution including approximately 1.5 mass % of blue polystyrenesulfonic acid doped poly(3,4-ethylenedioxylthiophene) was obtained. Then, imidazole was dispersed uniformly in this solution to obtain a conductive solid containing dispersion. The results of the particle size distribution measurement through a dynamic laser light scattering method in accordance with the measurement method set forth above of the relevant dispersion are shown in FIG. 3. Referring to FIG. 3, the particles of conductive solid and/or aggregates of the particles has four separated particle size distribution peaks, having an average particle size of 22.4, 138.1, 547.4 and 7427.8 nm. The standard deviation of these 4 particle size distribution peaks were 1.8, 22.1, 123.9 and 2820.7 from the smaller average particle size.

(2) Production of Electrolytic Capacitor

The forming voltage to form a dielectric film was as indicated in Table 1. An aluminum wound-type capacitor element having a rated voltage of 16 V and a nominal capacitance of 68 µF, directed to the finished dimension (outer dimension of the electrolytic capacitor in a stored state in an aluminum case) of 6.3 mm in diameter×6.0 mm in height was immersed in the above-described conductive solid containing dispersion for ten minutes at 25° C. under high vacuum of 89 kPa to cause the dispersion to adhere to the dielectric film (dispersion impregnation step). The average pore diameter of the pores formed on the dielectric film was approximately 0.1-0.4 µm, confirmed by SEM. An ultrasonic process was applied during immersion. The capacitor element was then placed in a drying furnace at 125° C. and kept for 30 minutes to cause evaporation of water. Thus, a conductive solid layer was formed (drying step). These dispersion impregnation step and drying step were repeated for the total of three times. The capacitor element having a conductive solid layer formed was then immersed in an electrolyte including triethylamine borodisalicylate (designated as A in Table 1) and γ-butyrolactone qualified as a solvent (triethylamine borodisalicylate concentration: 18 weight %) at 25° C. for 10 seconds for impregnation with the electrolyte (electrolyte impregnation step).

Then, the capacitor element was placed in an aluminum case. A rubber packing was attached to the opening of the case, followed by a drawing process and curling process. Subsequently, an aging process was carried out for approximately one hour at approximately 125° C. while applying a voltage 1.15 times the rated voltage indicated in Table 1. Thus, an electrolytic capacitor was produced.

The capacitance, ESR, tan δ (tangent of loss angle), and leakage current (LC) were measured for the relevant electrolytic capacitor. The results are shown in Table 1. The capacitance is the capacitance (μF) at 120 Hz. ESR is the ESR (mΩ) at 100 kHz. LC is the LC (μA) after 30 seconds from application of the rated voltage indicated in Table 1.

Examples 2 and 3

Electrolytic capacitors were produced in a manner similar to the method of Example 1, provided that the rated voltage, nominal capacitance, finished dimension (mm in diameter× mm in height), and forming voltage of the employed wound-type capacitor element were those shown in Table 1. The capacitance, ESR, tan δ (tangent of loss angle), and leakage current (LC) were measured for these electrolytic capacitors. The results are shown in Table 1.

Comparative Examples 1-3

Electrolytic capacitors were produced in a manner similar to the method set forth above of Example 1, provided that a dispersion including poly(3,4-ethylenedioxythiophene) particles having one particle size distribution peak over the range of 5-100 nm with an average particle size of 25 nm, and water as a solvent (poly (3,4-ethylenedioxythiophene) having a concentration of 2.35 mass %) was used and the rated voltage, nominal capacitance, finished dimension (mm in diameter× mm in height), and forming voltage of the wound-type capacitor element were those shown in Table 1. The capacitance, ESR, tan δ (tangent of loss angle), and leakage current (LC) were measured for these electrolytic capacitors. The results are shown in Table 1. In comparative Examples 1-3, the voltage could not be raised to 1.15 times the rated voltage indicated in Table 1 in the aging process.

dielectric film is not sufficient may be due to the fact that the etching pores in the aluminum foil are filled with the conductive solid particles, eliminating the entry of the electrolyte.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrolytic capacitor comprising a capacitor element including an anode body having a plurality of pores at a surface, a dielectric film formed at the surface of the anode body, and a cathode body formed on the dielectric film,
    said cathode body including a conductive solid layer,
    said conductive solid layer including particles of conductive solid and/or aggregates of said particles, formed using a dispersion including said particles and/or aggregates of said particles and a solvent, and
    said particles of conductive solid and/or aggregates of said particles in said dispersion having a first particle size distribution peak and a second particle size distribution peak satisfying a relationship of (1):

$$\mu_1 > \mu_2 \tag{1}$$

where $\mu_1$ and $\mu_2$ represent an average particle size of said first particle size distribution peak and said second particle size distribution peak, respectively, in particle size distribution measurement by a dynamic laser light scattering method.

2. The electrolytic capacitor according to claim 1, wherein said first particle size distribution peak has a highest scattering intensity higher than the highest scattering intensity of said second particle size distribution peak.

3. The electrolytic capacitor according to claim 1, wherein the average particle size $\mu_1$ of said first particle size distribution peak is equal to or larger than an average pore diameter of said pores, and the average particle size $\mu_2$ of said second particle size distribution peak is smaller than the average pore diameter of said pores.

TABLE 1

| | Finished Dimension (mm diameter × mm height) | Forming Voltage (V) | Conductive Polymer | Organic Salt | Rated Voltage (V) | Nominal Capacitance (μF) | Capacitance (μF) | tan δ | ESR (mΩ) | LC (μA) |
|---|---|---|---|---|---|---|---|---|---|---|
| Example 1 | 6.3 × 6.0 | 31 | Polyethylenedioxythiophene | A | 16 | 68 | 67.5 | 0.035 | 41.5 | 2.4 |
| Comparative Example 1 | 6.3 × 6.0 | 31 | Polyethylenedioxythiophene | A | 16 | 68 | 67.1 | 0.037 | 267.5 | 1133 |
| Example 2 | 8 × 10.5 | 62 | Polyethylenedioxythiophene | A | 35 | 100 | 96.7 | 0.025 | 17.7 | 13.5 |
| Comparative Example 2 | 8 × 10.5 | 62 | Polyethylenedioxythiophene | A | 35 | 100 | 96.3 | 0.058 | 164.6 | 2407 |
| Example 3 | 10 × 10.5 | 102 | Polyethylenedioxythiophene | A | 50 | 56 | 54.5 | 0.014 | 17.3 | 15.8 |
| Comparative Example 3 | 10 × 10.5 | 102 | Polyethylenedioxythiophene | A | 50 | 56 | 53.5 | 0.068 | 129.7 | 4229 |

It is appreciated from Table 1 that the electrolytic capacitors of the present invention have the ESR improved significantly. It is also appreciated that the electrolytic capacitors of the present invention have a leakage current (LC) extremely lower than that of the electrolytic capacitors of the comparative examples. This is due to the fact that microparticles (particle size 5-100 nm) entered the defect in the dielectric film of the comparative examples so that the voltage could not be raised to the defined voltage during the aging process, which is responsible for the insufficient repairing action at the dielectric film. The reason why the repairing action at the 4. The electrolytic capacitor according to claim 1, wherein said particles of conductive solid and/or aggregates of said particles in said dispersion further have a third particle size distribution peak and a fourth particle size distribution peak between said first particle size distribution peak and said second particle size distribution peak in the particle size distribution measurement by a dynamic laser light scattering method.

5. The electrolytic capacitor according to claim 4, wherein the average particle size of each of said first, third and fourth particle size distribution peaks is at least three times the average particle size of an adjacent particle size distribution peak having a smaller average particle size.

6. The electrolytic capacitor according to claim 4, wherein said first particle size distribution peak has a highest scattering intensity at least two times the highest scattering intensity of an adjacent particle size distribution peak having a smaller average particle size.

7. The electrolytic capacitor according to claim 4, wherein said first particle size distribution peak has a highest scattering intensity at least two times the highest scattering intensity of a particle size distribution peak having a third largest average particle size.

8. The electrolytic capacitor according to claim 1, wherein said conductive solid includes conductive polymer.

9. The electrolytic capacitor according to claim 8, wherein said conductive polymer is selected from at least one member of the group consisting of polypyrrole, polythiophene, and derivatives thereof.

10. The electrolytic capacitor according to claim 1, wherein said capacitor element includes a wound-type element having an electrode body formed of a metal foil with a dielectric film formed at a surface and an opposite cathode foil wound to a roll with a separator therebetween, said cathode body including an electrolyte.

11. The electrolytic capacitor according to claim 10, wherein said electrolyte includes a non-aqueous solvent and organic salt.

12. The electrolytic capacitor according to claim 1, wherein said non-aqueous solution is selected from at least one member of the group consisting of γ-butyrolactone and sulfolane, and said organic salt includes organic amine salt.

13. A production method of an electrolytic capacitor comprising a capacitor element including a wound-type element having an anode body made of a metal foil with a dielectric film formed at a surface and an opposite cathode foil wound to a roll with a separator therebetween, comprising the steps of:

impregnating the capacitor element with a dispersion including particles of conductive solid and/or aggregates of said particles and a solvent, said particles of conductive solid and/or aggregates of said particles in said dispersion having a first particle size distribution peak and a second particle size distribution peak satisfying a relationship of (1):

$$\mu_1 > \mu_2 \qquad (1)$$

where $\mu_1$ and $\mu_2$ represent an average particle size of said first particle size distribution peak and said second particle size distribution peak, respectively, in particle size distribution measurement by a dynamic laser light scattering method;

following impregnation with the dispersion, causing said solvent to evaporate to form a conductive solid layer at a surface of said dielectric film; and impregnating said conductive solid layer with an electrolyte in gaps.

* * * * *